United States Patent
Shin et al.

(10) Patent No.: US 7,813,532 B2
(45) Date of Patent: Oct. 12, 2010

(54) APPARATUS AND METHOD FOR RECOGNIZING FINGERPRINT DUALLY

(75) Inventors: Yo-Shik Shin, Seoul (KR); Geum-yong Kim, Seoul (KR)

(73) Assignee: Union Community Co., Ltd., Seoul (KR)

( * ) Notice: Subject to any disclaimer, the term of this patent is extended or adjusted under 35 U.S.C. 154(b) by 874 days.

(21) Appl. No.: 11/723,635

(22) Filed: Mar. 21, 2007

(65) Prior Publication Data
US 2008/0187189 A1   Aug. 7, 2008

(30) Foreign Application Priority Data
Feb. 5, 2007   (KR) ...................... 10-2007-0011574

(51) Int. Cl.
*G06K 9/00* (2006.01)
(52) U.S. Cl. .................... 382/116; 382/124; 382/125
(58) Field of Classification Search ................ 382/115, 382/116, 124, 125; 340/5.53, 5.83; 902/3; 713/186
See application file for complete search history.

(56) References Cited

U.S. PATENT DOCUMENTS

| | | | |
|---|---|---|---|
| 6,160,903 A * | 12/2000 | Hamid et al. ............... | 382/115 |
| 7,110,579 B2 * | 9/2006 | Hashimoto .................. | 382/124 |
| 7,203,344 B2 * | 4/2007 | McClurg et al. ............ | 382/115 |
| 7,277,562 B2 * | 10/2007 | Zyzdryn ..................... | 382/124 |
| 7,308,123 B2 * | 12/2007 | Fenrich et al. .............. | 382/125 |
| 2001/0026632 A1 * | 10/2001 | Tamai ......................... | 382/116 |
| 2003/0133143 A1 * | 7/2003 | McClurg et al. ........... | 358/1.14 |

* cited by examiner

*Primary Examiner*—John B Strege
(74) *Attorney, Agent, or Firm*—Sughrue Mion, PLLC

(57) ABSTRACT

Provided are an apparatus and a method for recognizing a fingerprint dually. In the method, an optical sensor unit and a semiconductor sensor unit are prepared such that they are adjacent to each other. The optical sensor unit is driven to obtain a first fingerprint image of a user's fingerprint according to an optical fingerprint recognizing method. A second fingerprint image of the fingerprint is obtained using the semiconductor sensor unit. First fingerprint data is generated from the first fingerprint image, and second fingerprint data is generated from the second fingerprint image. Data that matches with the first fingerprint data and the second fingerprint data are searched for from registration fingerprint data registered in advance so that authentication is performed. When authentication of the first fingerprint data and authentication of the second fingerprint data succeed, it is judged that authentication for the user's fingerprint has finally succeeded.

11 Claims, 3 Drawing Sheets

APPARATUS AND METHOD FOR RECOGNIZING FINGERPRINT DUALLY

BACKGROUND OF THE INVENTION

1. Field of the Invention

The present invention relates to an apparatus and a method for recognizing a fingerprint dually, capable of minimizing an error in discriminating an imitated fingerprint and recognizing strangers by simultaneously performing optical fingerprint recognition and semiconductor type fingerprint recognition.

2. Description of the Related Art

Recently, certificate technology using biometrics for identification is widely used in the fields of an access-control system of a special facility requiring extreme security, a household, and an apartment, an electronic commerce system through the Internet, an automatic telling machine (ATM), and a mobile phone.

The reason certificate technology using biometrics is in the limelight is that fingerprint, the iris, a voice, a face, vascular patterns are different depending on a person, and they have advantages of providing no inconvenience in carry, having low danger of being stolen or imitated, and not changing for a lifetime.

Particularly, fingerprint recognition of certificate technology is most widely commercialized currently because of various reasons of convenience, security, and economics.

Fingerprint recognition is roughly classified into optical fingerprint recognition and semiconductor type fingerprint recognition. The semiconductor type fingerprint recognition is classified into fingerprint recognition using temperature, fingerprint recognition using pressure, and fingerprint recognition using capacitance. Also, in an aspect of a method for using a fingerprint, a method for recognizing fingerprint is classified into a method for detecting an entire fingerprint at a time, and a method for continuously detecting a portion of fingerprint by scanning fingerprint.

An apparatus for recognizing fingerprint dose not solve a false authentication problem using imitated fingerprint despite convenience, accuracy, and economics of its authentication. A variety of methods have been proposed to prevent false authentication, but an effective method has not been proposed up to now.

Recently, there develops a system for preventing false authentication and minimizing an error by which a user is recognized as a stranger, not an authorized user through multiple biometrics using two or more bio characteristics such as fingerprint+face, fingerprint+voice, and face+the iris, getting out of limit of a single biometrics using only one of bio characteristics of a user.

However, since the multiple biometrics using different kinds of biometrics uses different objects to be recognized, it is difficult to realize the multiple biometrics as a system.

SUMMARY OF THE INVENTION

Accordingly, the present invention is directed to an apparatus and a method for recognizing a fingerprint dually that substantially obviate one or more problems due to limitations and disadvantages of the related art.

Embodiments of the present invention provide an apparatus and a method for recognizing fingerprint dually, capable of minimizing an error in discriminating an imitated fingerprint and recognizing strangers by simultaneously performing optical fingerprint recognition and semiconductor type fingerprint recognition.

In an aspect of the present invention, there is provided a method for recognizing a fingerprint dually, the method including: disposing an optical sensor unit and a semiconductor sensor unit such that they are adjacent to each other; driving the optical sensor unit to obtain a first fingerprint image of a user's fingerprint according to an optical fingerprint recognizing method; obtaining a second fingerprint image of the fingerprint using the semiconductor sensor unit; generating first fingerprint data, which is minutiae data, from the first fingerprint image and generating second fingerprint data, which is minutiae data, from the second fingerprint image; searching for data that matches with the first fingerprint data and the second fingerprint data from registration fingerprint data registered in advance, to perform authentication; and when authentication for the first fingerprint data and authentication for the second fingerprint data succeed, judging authentication for the user's fingerprint has finally succeeded.

The method may further include: when authentication for one of the first fingerprint data and the second fingerprint data succeeds, generating new fingerprint data according to a fingerprint recognizing method corresponding to the other failed fingerprint data; and when data of the registration fingerprint data registered in advance that matches with one of the first and second fingerprint data for which authentication has succeeded matches with the new fingerprint data, judging that authentication for the user's fingerprint has finally succeeded.

The performing of the authentication may include searching for data of the registration fingerprint data registered in advance that matches with one selected from the first fingerprint data and the second fingerprint data, and authenticating one of the first and second fingerprint data by judging whether one of the first and second fingerprint data that is not selected matches with the searched registration fingerprint data.

The driving of the optical sensor unit during the obtaining of the first fingerprint image is performed when a unit fingerprint image, which is a fingerprint image for a portion of the user's fingerprint, is obtained by the semiconductor sensor unit and touching of the user's fingerprint is confirmed.

In another aspect of the present invention, there is provided an apparatus for recognizing a fingerprint dually, the apparatus including: an optical sensor unit, a semiconductor sensor unit, a memory for storing registration fingerprint data, which are fingerprint data of a plurality of users registered in advance, and a control unit.

The optical sensor unit includes a first fingerprint input window to obtain a first fingerprint image for an entire fingerprint of a user touching it. The semiconductor sensor unit includes a second fingerprint input window located closely to the first fingerprint input window to obtain a unit fingerprint image for a portion of the fingerprint of the user touching it. When the unit fingerprint image is received from the semiconductor sensor unit, the control unit controls the optical sensor unit to operate, generates fingerprint data on the basis of the first fingerprint image received from the optical sensor unit, and compares the generated fingerprint data with the registration fingerprint data to perform authentication.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
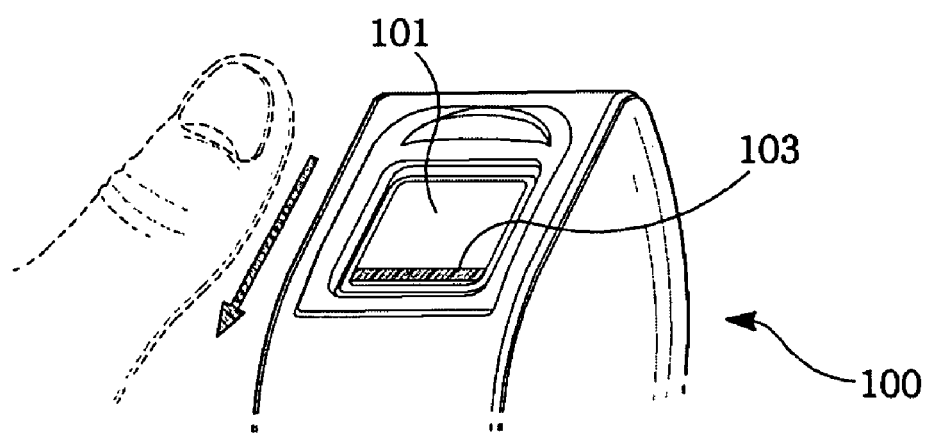
FIG. 1 is a perspective view of an apparatus for recognizing a fingerprint dually according to an embodiment of the present invention.

Referring to FIG. 1, the apparatus 100 for recognizing a fingerprint dually includes a first fingerprint input window 101 for optical fingerprint recognition, and a second fingerprint input window 103 for semiconductor type fingerprint recognition.

According to the optical fingerprint recognition, fingerprint recognition is performed by obtaining a fingerprint image from an entire fingerprint of a user touching the first fingerprint input window 101. According to the semiconductor type fingerprint recognition, fingerprint recognition is performed by obtaining step by step a fingerprint image from a fingerprint of a user touching the second fingerprint input window 103 in a sliding manner. Through the above process, two steps of obtaining fingerprint images are performed when a user carries out one time of a fingerprint touching operation.

Therefore, the first fingerprint input window 101 preferably has an area allowing an entire fingerprint of the user to touch thereto. The second fingerprint input window 103 is preferably located closely to the first fingerprint input window 101 and realized in a band shape to detect a portion of the user's fingerprint.

Also, in the case where the user's finger generally touches the first fingerprint input window 101 and the second fingerprint input window 103 at a time, it is preferable that the first fingerprint input window 101 is located in a front end direction of the finger, and the second fingerprint input window 103 is located in the palm direction.

In addition to its own function, a semiconductor type fingerprint recognizer using the second fingerprint input window 103 can serve as an element for detecting whether the user's fingerprint touches to mediate an optical fingerprint recognition process using the first fingerprint input window 101.

An apparatus 200 for recognizing a fingerprint according to the present invention will be described with reference to FIG. 2.

Figure 2:
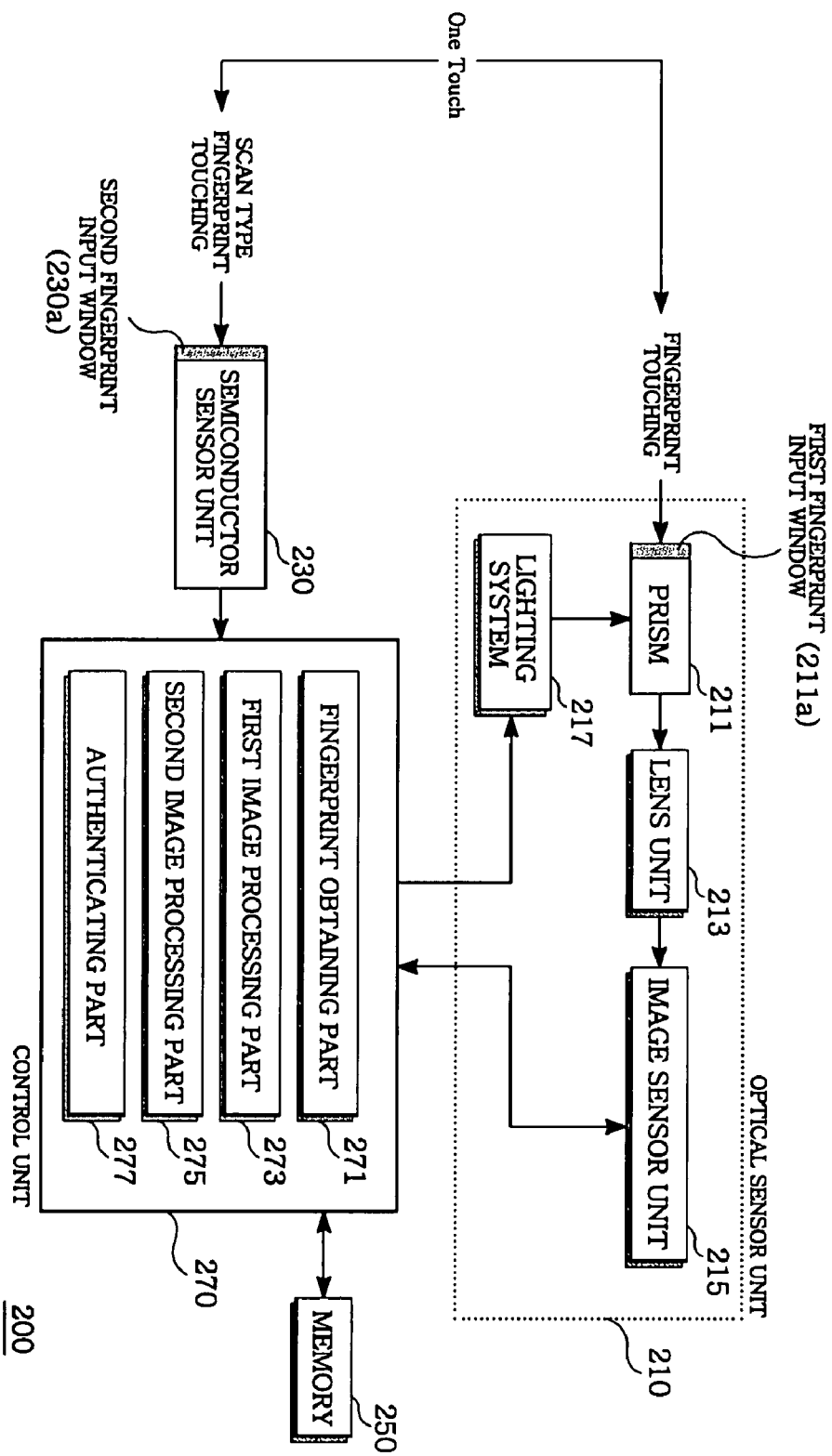
FIG. 2 is a block diagram of an apparatus for recognizing a fingerprint dually according to an embodiment of the present invention.

Referring to FIG. 2, the apparatus 200 includes an optical sensor unit 210, a semiconductor sensor unit 230, a memory 250, and a control unit 270. The optical sensor unit 210 includes a first fingerprint input window 211a. The semiconductor sensor unit 230 includes a second fingerprint input window 230a. The first fingerprint input window 211a and the second fingerprint input window 230a correspond to the first fingerprint input window 101 and the second fingerprint input window 103 of FIG. 1.

The optical sensor unit 210 includes a prism 211, a lens unit 213, an image sensor unit 215, and a lighting system 217 to obtain the first fingerprint image for a fingerprint touching thereto. The optical sensor unit 210 is classified into an absorption type optical sensor unit and a scattering type optical sensor unit depending on a form in which the prism 211 and the lighting system 217 are realized.

The image sensor unit 215 and the lighting system 217 operate in response to a control signal of the control unit 270 according to a fingerprint recognition algorithm.

With the first fingerprint input window 211a formed on one side of the prism 211 touched by a user's finger, light illuminated from the lighting system 217 onto the first fingerprint input window 211a is totally reflected, scattered, or refracted by ridges and valleys of a fingerprint of the finger. Through this, the light whose path has been changed is guided to the lens unit 213.

The lens unit 213 allows the light guided by the prism 211 to be condensed and input to the image sensor unit 215.

The image sensor unit 215 may be a charge coupled device (CCD) or a complementary metal oxide semiconductor (CMOS) sensor. The image sensor unit 215 outputs the first fingerprint image, which is a digital image of the fingerprint corresponding to incident light through the lens unit 213, to a control unit 270.

The semiconductor sensor unit 230 includes a heat detecting type semiconductor sensor, a pressure detecting type semiconductor sensor, or a capacitance detecting type semiconductor sensor to obtain a unit fingerprint image from a user's fingerprint touching it. Preferably, an imitated fingerprint can be effectively discriminated using the heat detecting type semiconductor sensor unit 230.

When a finger touches the second fingerprint input window 230a formed on one side of the semiconductor sensor unit 230, the semiconductor sensor unit 230 obtains a unit fingerprint image of a fingerprint of the finger touching it and outputs the obtained fingerprint image to the control unit 270. When the user sequentially scans his fingerprint, the semiconductor sensor unit 230 sequentially obtains a unit fingerprint image corresponding to a portion of the fingerprint that is being scanned, and outputs the same to the control unit 270. A second fingerprint image is an entire fingerprint image of the user that is obtained by the semiconductor sensor unit 230. The second fingerprint image can be completed by merging a plurality of unit fingerprint images.

The memory 250 stores an entire operating program of the apparatus 200, fingerprint data (referred to as 'registration fingerprint data' hereinafter) of a user registered in advance, and authentication log data. The registration fingerprint data stored in the memory 250 correspond to minutiae data extracted from the registered fingerprint data of the user.

The control unit 270 controls an operation of the apparatus 200 on the whole. The control unit 270 controls the optical sensor unit 210 and the semiconductor sensor unit 230 to obtain first and second fingerprint images, and performs a fingerprint authentication process on the basis of the first and second fingerprint images. Also, the control unit 270 transmits fingerprint authentication results to an external apparatus performing a substantial operation depending on the fingerprint authentication results. Furthermore, the control unit 270 can perform a fingerprint registration process for another user. Description of a fingerprint registration process and a function of transmitting authentication results to the external apparatus of the functions of the control unit 270 will be omitted in the following description.

The control unit 270 includes a fingerprint obtaining part 271, a first image processing part 273, a second image processing part 275, and an authenticating part 277.

The fingerprint obtaining part 271 controls the optical sensor unit 210 and the semiconductor sensor unit 230 according to a predetermined algorithm to obtain a fingerprint image of a user.

For example, for power consumption reduction and life extension, the fingerprint obtaining part 271 can control the lighting system 217 and/or the image sensor unit 215 of the optical sensor unit 210 to operate only while fingerprint recognition is substantially performed. For this purpose, the fingerprint obtaining part 271 judges whether a fingerprint of the user touches the first fingerprint input window 211a on the basis of whether a unit fingerprint image has been input from the semiconductor sensor unit 230. At this point, since the fingerprint image input from the semiconductor sensor unit 230 is intended for judging whether the fingerprint of the user has touched it, a fingerprint image for a portion of an entire fingerprint can be used as the fingerprint image.

When a unit fingerprint image is input from the semiconductor sensor unit 230, the fingerprint obtaining part 271 judges that the user's fingerprint has touched the first fingerprint input window 211a and operates the lighting system 217 to perform optical fingerprint authentication.

The fingerprint obtaining part 271 delivers fingerprint images input from the image sensor unit 215 and the semiconductor sensor unit 230 to the first image processing part 273 and the second image processing part 275, respectively.

The fingerprint obtaining part 271 can repeatedly perform a process for obtaining a new fingerprint image from one of the optical sensor unit 210 and the semiconductor sensor unit 230 depending on fingerprint authentication results received from the authenticating part 277. Particularly, in the case where only one of optical fingerprint authentication and semiconductor type fingerprint authentication succeeds, the above process can be performed.

For example, in the case where the optical fingerprint authentication fails, the fingerprint obtaining part 271 requests retouching of the fingerprint of the user by providing voice or outputting a screen on the authentication results of the authenticating part 277 to obtain a new fingerprint image.

The first image processing part 273 extracts minutiae data (referred to as 'first fingerprint data' hereinafter) from the first fingerprint image input from the image sensor unit 215, and outputs the extracted data to the authenticating part 277.

The second image processing part 275 synthesizes one entire second fingerprint image using unit fingerprint images sequentially input from the semiconductor sensor unit 230, extracts minutiae data (referred to as 'second fingerprint data' hereinafter) from the synthesized second fingerprint image, and outputs the extracted data to the authenticating part 277.

The authenticating part 277 performs an authentication process by judging whether there is data of registration fingerprint data stored in the memory 250 that matches with one of the first fingerprint data input from the first image processing part 273 and the second fingerprint data input from the second image processing part 275. When there is corresponding data of the registration fingerprint data, the authenticating part 277 judges authentication for corresponding fingerprint data has succeeded.

Also, the authenticating part 277 finally judges that a user's fingerprint is authenticated only when both fingerprint authentication using the first fingerprint data and fingerprint authentication using the second fingerprint data have succeeded. On the other hand, the authenticating part 277 can finally judge that the user's fingerprint has not been authenticated when even one of the first fingerprint data and the second fingerprint data has not been successfully authenticated.

An example of the authentication method by the authenticating part 277 is given by Table 1 below.

TABLE 1

| Authentication using first fingerprint data | Authentication using second fingerprint data | Final authentication of user's fingerprint |
| --- | --- | --- |
| Success | Success | Success |
| Failure | Success | Failure |
| Success | Failure | Failure |
| Failure | Failure | Failure |

According to embodiments, the authenticating part 277 can perform a fingerprint authentication process using update of the fingerprint data for which authentication has failed when authentication has succeeded for only one of the first and second fingerprint data.

For example, it is assumed that authentication using the second fingerprint data has succeeded but authentication using the first fingerprint has failed.

The authenticating part 277 delivers the authentication failure of the first fingerprint data to the fingerprint obtaining part 271, and controls the fingerprint obtaining part 271 to generate a new first fingerprint image for a new first fingerprint data. And then the authenticating part 277 receives the new first fingerprint data from the first image processing part 273. When performing authentication using the new first fingerprint data and succeeding in authenticating the fingerprint, the authenticating part 277 judges that the authentication of the user's fingerprint has finally succeeded. For this purpose, the fingerprint obtaining part 271 can output a guide message requesting retouching of the fingerprint through an output unit (not shown) for outputting a predetermined voice or image.

Also, when comparing the first and second fingerprint data with registered fingerprint data, the authenticating part 277 can perform a searching process only on one data (e.g., the first fingerprint data) without performing the searching process in parallel, and compare the other data (e.g., the second fingerprint data) directly with the searched data to judge whether they match with each other.

Figure 3:
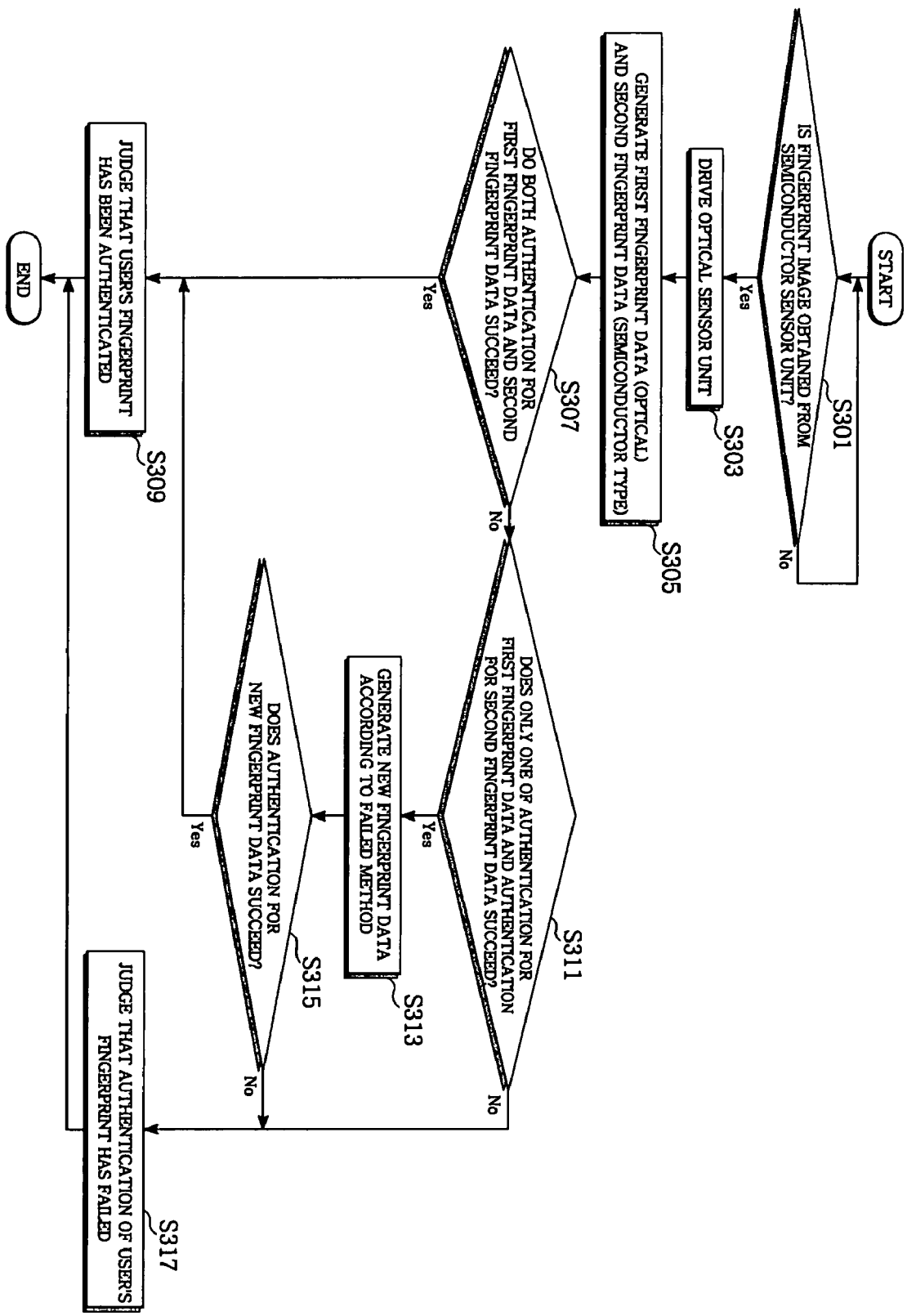
FIG. 3 is a flowchart explaining a method for recognizing a fingerprint dually according to an embodiment of the present invention.

A method for recognizing a fingerprint dually in the apparatus 200 of the present invention will be described with reference to FIG. 3 below.

When receiving a predetermined fingerprint image (e.g., a unit fingerprint image) from the semiconductor sensor unit 230 (S301), the fingerprint obtaining part 271 judges that the finger of a user has touched the first fingerprint input window 211a and the second fingerprint input window 230a, and drives the optical sensor unit 210 (S303).

The fingerprint obtaining part 271 delivers a first fingerprint image received from the optical sensor unit 210 to the first image processing part 273, and delivers a unit fingerprint image received from the semiconductor sensor unit 230 to the second image processing part 275. After that, the first image processing part 273 generates a first fingerprint data, and the second image processing part 275 generates a second fingerprint data (S305).

The authenticating part 277 performs authentication on the first fingerprint data received from the first image processing part 273 and the second fingerprint data received from the second image processing part 275 to judge whether the authentication has succeeded for both the first and second fingerprint data (S307).

When both the first and second fingerprint data have been authenticated as a result of the judgment in S307, it is judged that the fingerprint of the user has been finally authenticated (S309).

When only one of the first and second fingerprint data has been authenticated (S311) as a result of the judgment in S307, the authenticating part 277 provides the authentication result to the fingerprint obtaining part 271 to allow a process of generating new fingerprint data according to a fingerprint recognizing method corresponding to the other failed fingerprint data to be performed. When the authentication for the first fingerprint data fails as described above, the optical sensor unit 210 and the first image processing part 273 generate new first fingerprint data (S313).

The authenticating part 277 performs authentication on the new fingerprint data to judge whether the new fingerprint data is authenticated. When the new fingerprint data is authenticated, the authenticating part 277 judges that the user's fingerprint has been finally authenticated (S315).

When authentication fails for both the first and second fingerprint data as a result of the judgment in S311, or when authentication fails for the new fingerprint data as a result of the judgment in S315, the authenticating part 277 judges that authentication of the user's fingerprint has finally failed (S317).

Through the above process, the method for recognizing a fingerprint dually in the apparatus 200 of the present invention is performed.

According to another embodiment, S301 and S303 can be omitted. For example, a separate sensor (e.g., an infrared sensor) is provided to judge whether the fingerprint of the user has touched the first fingerprint input window 211a or the second fingerprint window 230a. After that, a fingerprint authentication process can be performed on the basis of a fingerprint image obtained through the first fingerprint input window 211a or the second fingerprint input window 230a. A more effective fingerprint authentication process having a reduced error can be performed by performing a plurality of fingerprint authentication processes.

According to another embodiment of the present invention, scanning of a user's fingerprint on the second fingerprint input window 230a can be omitted. An entire fingerprint recognizing process can be started when the user touches the second fingerprint input window 230a with his fingerprint.

Since a fingerprint recognizing process of the optical sensor unit 210 is started by detection of the semiconductor sensor unit 230, it can be judged that the user's fingerprint has been finally authenticated even when authentication of the entire second fingerprint data does not necessarily succeed.

For example, as the user's fingerprint touches the semiconductor sensor unit 230 (e.g., a first unit fingerprint image is generated), an authentication process is performed on the basis of the optical sensor unit 210 and the first image processing part 273. When registration fingerprint data that matches with the first fingerprint data is searched during the authentication process (in other words, the first fingerprint data is successfully authenticated), an authentication process of the user's entire fingerprint can be simply performed by judging whether fingerprint data corresponding to the first unit fingerprint image initially generated by the semiconductor sensor unit 230 partially matches with the searched registration fingerprint data.

Therefore, the process of scanning a fingerprint on the second fingerprint input window 230a by the user, and a process of searching for registration fingerprint data that matches with the second fingerprint data can be omitted.

Also, even when the user does not scan his fingerprint on the second fingerprint input window 230a, a portion missed in the first unit fingerprint image can be complemented using the first fingerprint image, so that the second fingerprint image can be created.

As described above, an apparatus for recognizing a fingerprint according to the present invention performs optical fingerprint recognition and semiconductor type fingerprint recognition simultaneously to discriminate an imitated fingerprint and minimize an error in recognizing a stranger.

Also, searching for one fingerprint data in comparing first fingerprint data and second fingerprint data with registration fingerprint data makes it possible to estimate whether the other fingerprint data matches with the registration fingerprint data even when searching is not performed on the other fingerprint data.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for recognizing a fingerprint dually in an apparatus for recognizing the fingerprint, the method comprising:

disposing an optical sensor unit and a semiconductor sensor unit such that they are adjacent to each other;

driving the optical sensor unit to obtain a first fingerprint image of a user's fingerprint according to an optical fingerprint recognizing method;

obtaining a second fingerprint image of the fingerprint using the semiconductor sensor unit;

generating first fingerprint data, which is minutiae data, from the first fingerprint image and generating second fingerprint data, which is minutiae data, from the second fingerprint image;

searching for data that matches with the first fingerprint data and the second fingerprint data from of registration fingerprint data registered in advance, to perform authentication; and when authentication for the first fingerprint data and authentication for the second fingerprint data succeed, judging authentication for the user's fingerprint has finally succeeded.

2. The method according to claim 1, further comprising:

when authentication for one of the first fingerprint data and the second fingerprint data succeeds, generating new fingerprint data according to a fingerprint recognizing method corresponding to the other failed fingerprint data; and when data of the registration fingerprint data registered in advance that matches with one of the first and second fingerprint data for which authentication has succeeded matches with the new fingerprint data, judging that authentication for the use's fingerprint has finally succeeded.

3. The method according to claim 1, wherein the performing of the authentication comprises:

searching for data that matches with one selected from the first fingerprint data and the second fingerprint data from the registration fingerprint data registered in advance, and authenticating one of the first and second fingerprint data by judging whether one of the first and second fingerprint data that is not selected matches with the searched registration fingerprint data.

4. The method according to claim 3, further comprising:
when authentication for one of the first fingerprint data and the second fingerprint data succeeds, generating new fingerprint data according to a fingerprint recognizing method corresponding to the other failed fingerprint data; and
when data of the registration fingerprint data registered in advance that matches with one of the first and second fingerprint data for which authentication has succeeded matches with the new fingerprint data, judging that authentication for the user's fingerprint has finally succeeded.

5. The method according to claim 1, wherein the driving of the optical sensor unit during the obtaining of the first fingerprint image is performed when a unit fingerprint image, which is a fingerprint image for a portion of the user's fingerprint, is obtained by the semiconductor sensor unit and touching of the user's fingerprint is confirmed.

6. A method for authenticating a fingerprint dually in an apparatus for recognizing the fingerprint, the method comprising:
disposing an optical sensor unit for sensing one entire fingerprint of a user's finger, and a semiconductor sensor unit for sensing a portion of the fingerprint such that they are adjacent to each other;
when the fingerprint touches the semiconductor sensor unit and a portion of the fingerprint is obtained as a unit fingerprint image, driving the optical sensor unit to obtain a first fingerprint image of the fingerprint according to an optical fingerprint recognizing method;
generating first fingerprint data, which is minutiae data, from the first fingerprint image; and
searching for data of registration fingerprint data registered in advance that matches with the first fingerprint data to perform authentication.

7. The method according to claim 6, further comprising:
generating unit fingerprint data, which is minutiae data, from the unit fingerprint image obtained during the obtaining of the first fingerprint image; and
when authentication of the first fingerprint data succeeds, judging whether the searched registration fingerprint data that matches with the first fingerprint data partially matches with the unit fingerprint data, and when the searched registration fingerprint data that matches with the first fingerprint data partially matches with the unit fingerprint data, judging that authentication of the user's fingerprint has finally succeeded.

8. An apparatus for recognizing a fingerprint dually, the apparatus comprising:
A first fingerprint input window touched by a finger;
A second fingerprint input window located adjacently to the first fingerprint input window;
an optical sensor unit for obtaining a first fingerprint image of the finger through the first fingerprint input window;
a semiconductor sensor unit for obtaining a unit fingerprint image of a portion of the finger through the second fingerprint input window;
a memory for storing registration fingerprint data, which are fingerprint data of a plurality of users registered in advance; and
a control unit for controlling the optical sensor unit to operate when the unit fingerprint image is input from the semiconductor sensor unit, generating fingerprint data on the basis of the first fingerprint image received from the optical sensor unit, and comparing the generated fingerprint data with the registration fingerprint data to perform authentication.

9. The apparatus according to claim 8, wherein the control unit comprises:
a first image processing part for generating first fingerprint data, which is minutiae data, from the first fingerprint image;
a second image processing part for synthesizing a second fingerprint image, which is an entire fingerprint image, using a plurality of unit fingerprint images sequentially obtained by the semiconductor sensor unit, and generating second fingerprint data, which is minutiae data of the second fingerprint image;
a fingerprint obtaining part for controlling the optical sensor unit to operate depending on whether the unit fingerprint image is input from the semiconductor sensor unit, and delivering the first fingerprint image received from the optical sensor unit and the second fingerprint image received from the semiconductor sensor unit, to the first image processing part and the second image processing part, respectively; and
an authenticating part judging that the user's fingerprint has been finally authenticated when there is data of the registration fingerprint data stored in the memory that matches with the first and second fingerprint data.

10. The apparatus according to claim 9, wherein the authenticating part searches for data that matches with one selected from the first and second fingerprint data from of the registration fingerprint data, and authenticates one of the first and second fingerprint data by judging whether one of the first and second fingerprint data that is not selected matches with the searched registration fingerprint data.

11. The apparatus according to claim 8, wherein the control unit comprises:
a first image processing part for generating first fingerprint data, which is minutiae data, from the first fingerprint image;
a second image processing part for generating second fingerprint data, which is minutiae data, using the unit fingerprint image obtained by the semiconductor sensor unit;
a fingerprint obtaining part for controlling the optical sensor unit to operate depending on whether the unit fingerprint image is input from the semiconductor sensor unit, and delivering the first fingerprint image received from the optical sensor unit and the unit fingerprint image received from the semiconductor sensor unit, to the first image processing part and the second image processing part, respectively; and
an authenticating part for searching for fingerprint data that matches with the first fingerprint data from the registration fingerprint data stored in the memory, and judging that the user's fingerprint has been authenticated when the second fingerprint data matches with a portion of the searched registration fingerprint data.

* * * * *